(12) United States Patent
Wu

(10) Patent No.: US 7,880,998 B2
(45) Date of Patent: Feb. 1, 2011

(54) MULTIPLE WRITING PROCESS FOR MAGNETIC BIT-PATTERNED MEDIA

(75) Inventor: Xiao Z. Wu, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 361 days.

(21) Appl. No.: 12/004,915

(22) Filed: Dec. 21, 2007

(65) Prior Publication Data

US 2009/0161256 A1    Jun. 25, 2009

(51) Int. Cl.
    *G11B 15/12*    (2006.01)
(52) U.S. Cl. .............................. 360/61; 360/60; 360/68
(58) Field of Classification Search .................. None
    See application file for complete search history.

(56) References Cited

U.S. PATENT DOCUMENTS

| | | |
|---|---|---|
| 4,287,540 A | 9/1981 | Cheatham et al. |
| 5,422,761 A | 6/1995 | Anderson et al. |
| 5,600,500 A | 2/1997 | Madsen et al. |
| 5,687,036 A | 11/1997 | Kassab |
| 5,820,769 A | 10/1998 | Chou |
| 6,493,161 B1 | 12/2002 | Elliott et al. |
| 6,754,017 B2 | 6/2004 | Rettner et al. |
| 6,801,379 B2 | 10/2004 | Ozue et al. |
| 7,570,451 B2 * | 8/2009 | Bedillion et al. .......... 360/78.05 |
| 7,599,139 B1 * | 10/2009 | Bombet et al. ................. 360/31 |
| 2005/0073761 A1 | 4/2005 | Aida et al. |
| 2006/0072229 A1 | 4/2006 | Yun et al. |
| 2006/0114587 A1 | 6/2006 | Kalahasthi et al. |
| 2006/0176599 A1 | 8/2006 | Semba |
| 2006/0279877 A1 | 12/2006 | Song |

FOREIGN PATENT DOCUMENTS

| | | |
|---|---|---|
| JP | 52-89902 | 7/1977 |
| JP | 1-263901 | 10/1989 |
| JP | 2-206082 | 8/1990 |
| JP | 3-295008 | 12/1991 |
| JP | 2001243601 | 9/2001 |
| JP | 2002237005 | 8/2002 |
| JP | 2003173504 | 6/2003 |
| JP | 2005011454 | 1/2005 |
| KR | 2003-38256 | 8/2003 |
| SU | 1476527 A1 | 4/1989 |

OTHER PUBLICATIONS

White et al., "Patterned Media: A Viable Route to 50 Gbit/in2 and Up for Magnetic Recording?" IEEE Trans on Mag., vol. 33, No. 1, Jan. 1997, pp. 990-995.

* cited by examiner

*Primary Examiner*—Jason C Olson
(74) *Attorney, Agent, or Firm*—Darren Gold

(57) ABSTRACT

Two pass writing system and method for patterned media. In a first step, a write head of a hard disk drive writes with a strong write field. In a second step, a write head of the hard disk drive writes with a weak field. In this manner, magnetic islands of patterned media are written in the first step. In the second step, only those magnetic islands with a low switching field are written.

20 Claims, 7 Drawing Sheets

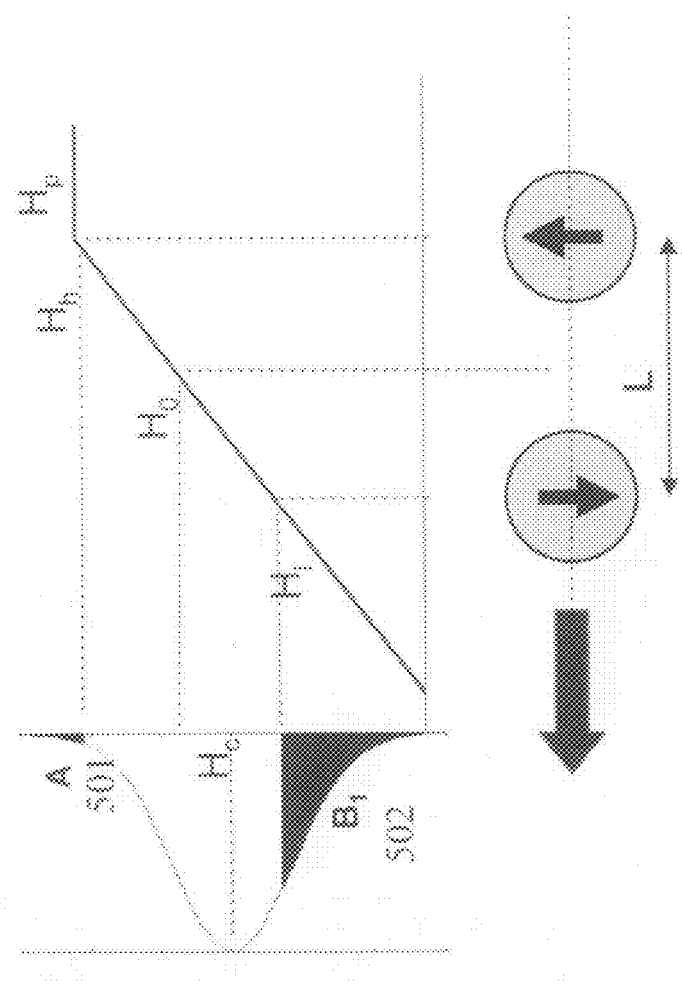

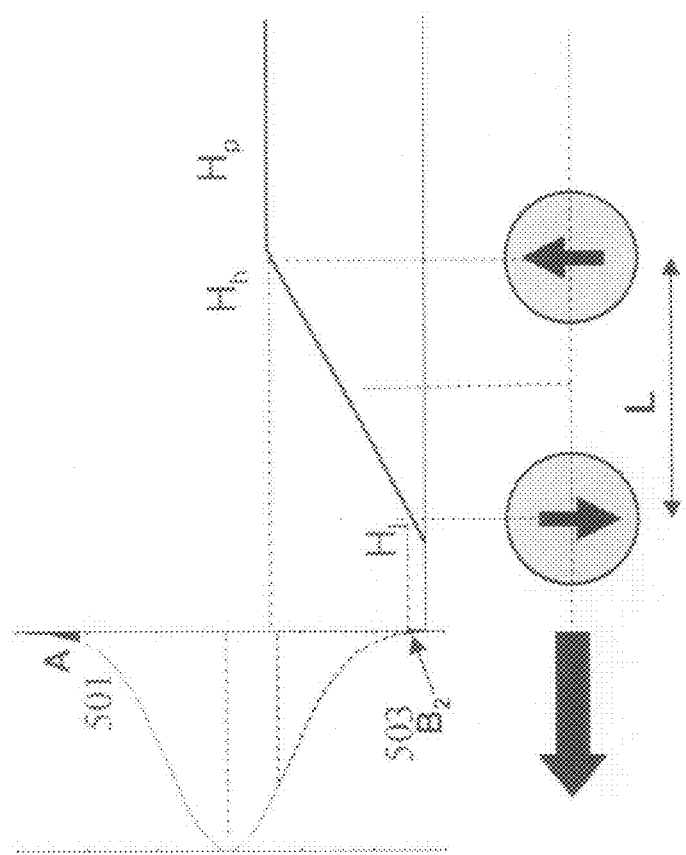

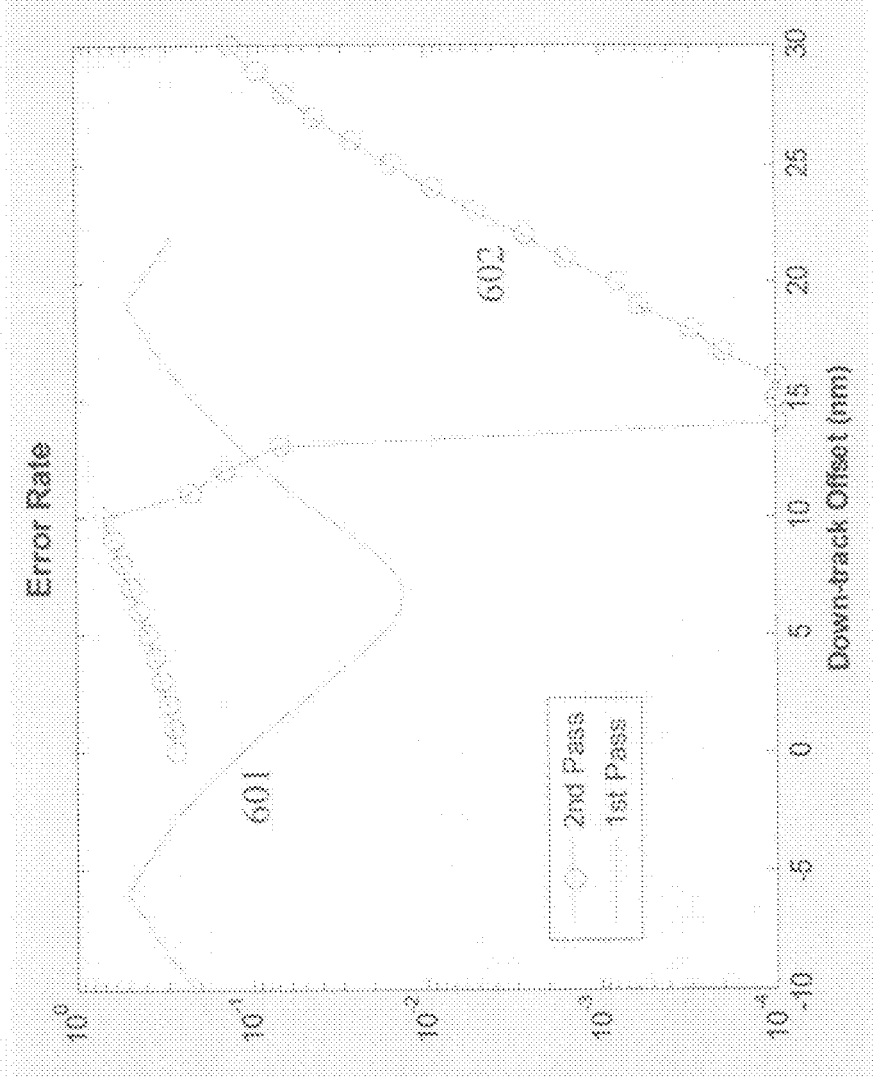

MULTIPLE WRITING PROCESS FOR MAGNETIC BIT-PATTERNED MEDIA

BACKGROUND OF THE INVENTION

The heart of a computer's long term memory is an assembly that is referred to as a magnetic hard disk drive. The hard disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head is generally an inductive write element that includes an electrically conductive coil that generates a magnetic flux in a write pole. The read head includes a magnetoresitive sensor. In current read head designs, either a giant magnetoresistive (GMR) sensor, or a tunneling magnetoresistive (TMR) sensor, has been employed for sensing magnetic fields from the rotating magnetic disk. The sensor includes a free layer which responds to an external field and a pinning layer whose polarity is fixed. The resistance value of the sensor changes with the relative polarity between the free layer and the pinning layer.

On a conventional disk, the magnetic surface of the disk is continuous. Binary information is recorded on the disk by polarizing a unit (called a bit) of the disk to be one polarity which representing a value of "1". On the other hand the bit can be in the opposite polarity which represents the value of "0". The smaller the bit, the more information can be stored in a given area. Present magnetic recording may achieve a bit as small as around 18×80 nanometers. Each bit includes multiple magnetic grains, and the typical grain size is about 6 nanometers. Therefore, in a bit of size 18×80 nanometers, there are about 40 grains.

To increase the areal density of the magnetic disk, the bit size is reduced. If the grain sizes are kept the same for smaller bit sizes, then there would be a smaller number of grains in a bit resulting in a smaller signal-to-noise ratio (SNR). If the grain sizes are reduced proportionally to keep the number of grains in a bit constant for smaller bit sizes, then the SNR would be the same. However, the super-paramagnetic effect would occur when grain sizes are reduced to too small a size since the magnetic grains on the disk become so tiny that ambient temperature can reverse their magnetic orientations over the course of the time. The result in such a reversal is that the bit is erased and the data is lost.

One solution to the problems posed by the super-paramagnetic effect is to pattern the magnetic disk. In magnetic patterned media, the magnetic material is patterned into small magnetically isolated blocks or magnetic islands and in each magnetic island there is only a single magnetic domain. The single magnetic domain can be a single grain or consist of a few strongly coupled grains that switch magnetic states in concert as a single magnetic volume. Each island serves as the basic storage element "bit". This is in contrast to conventional continuous media wherein a single "bit" may have multiple magnetic domains separated by grain boundaries. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording", IEEE Transactions on Magnetics, Vol. 33, No. 1, January 1997, 990-995.

Patterned magnetic recording media, including Bit-Patterned-Media (BPM) is therefore a promising solution to overcome the super-paramagnetic limit facing continuous perpendicular and longitudinal media. In BPM, each bit consists of only one independent island which has a single magnetic domain, in contrast to continuous media where each bit consists of multiple grains. Each island though may have a different switching field (SF), which is the minimum field need to flip the polarity of an island from one to the opposite.

Bit-patterned media (BPM) needs a tight switching field distribution of the magnetic islands in a proper range to enable correct recording. If an SF of an individual island is higher than a peak field of a write head writing the island, the island will never be written by the write head. However, this issue can be addressed by using a write head with a sufficient peak field to write all the islands, or manufacturing a media with low enough SF for each island. However, even for an SF below the peak field of the write head, the SF distribution has to be tight enough to avoid an island being either not written successfully or being overwritten when writing adjacent or near by bits.

FIG. 3 graphically illustrates the situations where the write field is over both the island intended to be written 303 as well as its neighboring islands 304, 305. There are errors in writing the intended to write island 303, and in over-writing the island which had been written in previous write clock 304. The area A 301 of FIG. 3 indicates the population of islands which are at the high end of the SF distribution of the magnetic islands. Their switching fields are above the highest write field $H_h$ employed to write a bit. Typically, a bit is written at a level $H_h$, which is lower than the peak write head field $H_p$. The resultant errors in area A (301) will be referred to as type A errors. An example of when an island is overwritten when writing the next bits is area B 302 of FIG. 3 and corresponds to bit 304. The switching fields of these islands are so low, below $H_l$, that the fringing field of the write head when writing the current island 303 will flip the polarities of the previous islands 304. These overwritten islands are from islands at the lower-end of the SF distribution and overwriting these islands will be referred to as type B errors. Both A and B type errors contribute to the error rate. If a stronger field is used to minimize the no-write error (area A 301), the over-written error (area B 302) will increase. Consequently, the total sum of errors of type A and type B will be increased. On the other hand, if a weaker field is used to minimize the over-written error (area B), then the no-write error (type A) will increase and consequently the sum of the errors of type A and type B (A+B) will be increased. A proper recording process minimizes the total write-in errors, i.e., the sum of A and B. The conventional process to minimize A+B is to achieve some compromise between A and B. However, in this compromise, neither A nor B is minimized. Although the sum A+B is the minimized, it is still far greater than the sum of A and B if both A and B were minimized. Therefore, a method and system is needed to further minimize the total errors A+B to the level that both type A and type B errors are jointly minimized.

SUMMARY OF THE INVENTION

Described is a method and system to write to a bit-patterned media disk where each recorded bit is in a separate magnetic island. The media is written in two passes. In a first pass, a high write field is used to write the bits to minimize the no-write errors (type A errors). In a second pass, a lower power write field is used to write the bits to correct the over-written errors (type B errors). In this way, islands with a high switch field are effectively written on the first pass, while those bits with a low switch field are effectively written on a second pass. Therefore, errors of type A and type B be will be minimized separately, and the resultant sum of type A and type B errors (A+B) will be smaller than the minimum value A+B achieved with a single pass write scheme.

The system can be implemented with various head configurations. A single write head can be used over two passes to write the bits. Alternatively two single write heads on separate or a single slider can be used to write the bits in one revolution of the bit-patterned media.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 5a is a graphical illustration of a first writing pass onto a bit-patterned media.

FIG. 5b is a graphical illustration of a second writing pass onto a bit-patterned media.

FIG. 6 is a graph of the total error rate using a one pass process and a two pass process, respectively.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
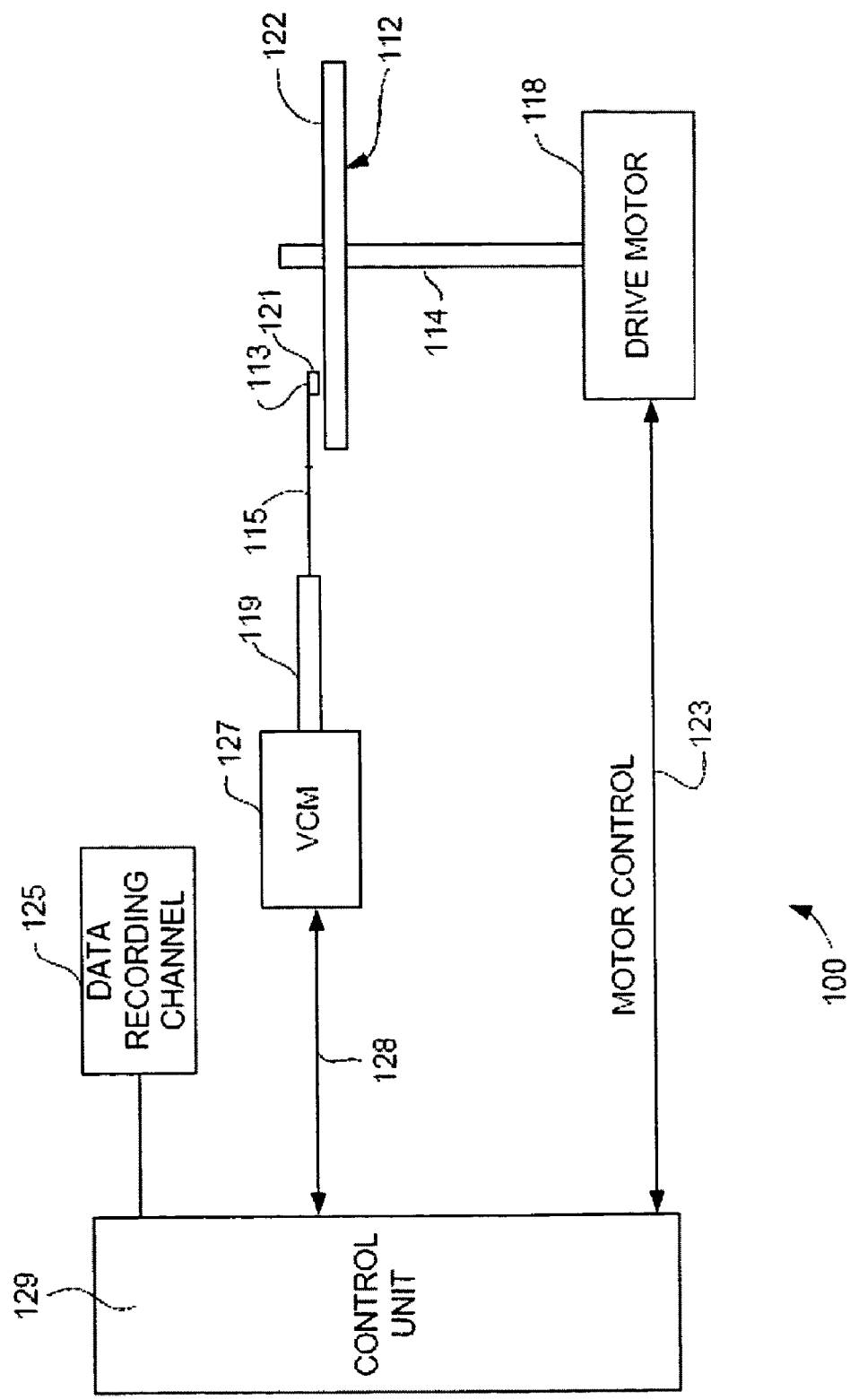
FIG. 1 is a schematic of a hard disk drive.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
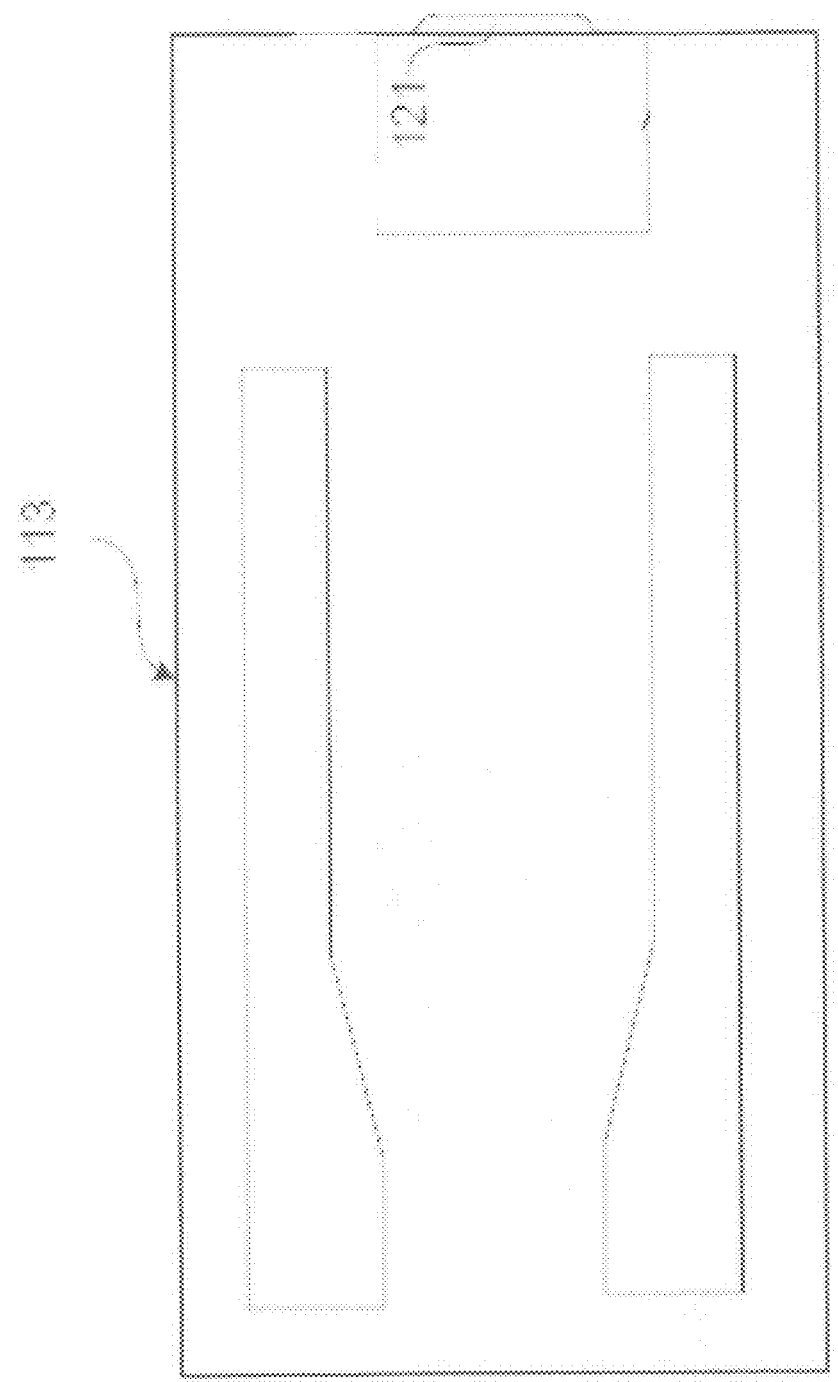
FIG. 2 is a figure of a slider of a hard disk drive.

With reference to FIG. 2, the orientation of the magnetic head 121 in a slider 113 can be seen in more detail. FIG. 2 is an ABS view of the slider 113, and the magnetic head of the slider including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

As described in FIG. 3, the errors 301 of not being able to write on an island 303 (hereinafter referred to as errors of type A) and the errors 302 of unintentionally writing over an previously written island 304 (hereinafter referred to as errors of type B) are related to the head write field ($H_0$) when a transition is written, the sigma (standard deviation) of switching fields distribution of the islands ($\sigma_H$), the head field gradient dH/dx and the island spacing L. When a write head has a higher field, there are fewer errors of type A but more errors of type B. When a write head has a lower field, there are fewer errors of type B but more errors of type A. To minimize the sum of error types A and B, the field is set at an intermediate level, $H_0$, around the average of the SF distribution of all the islands ($H_c$). The resultant minimum error rate A+B is determined by a parameter S, where $S=L*(dH/dx)*(1/\sigma_H)$. The larger the S, the smaller the error rate A+B.

Larger field gradients or tighter switching field distributions (i.e. smaller $\sigma_H$) result in larger S, and thus smaller error rates. However, as density increases, L becomes ever smaller, and to keep S constant, the requirements on dH/dx and $\sigma_H$ become more stringent. It is very challenging to develop a write head technology to significantly increase dH/dx. Additionally, it is difficult to reduce the $\sigma_H$ of the SF distribution of the islands to be small enough.

Therefore, it is unlikely that the S will be large enough to achieve a small enough error rate A+B using a current single pass write scheme. Thus it is important to provide a write process that delivers a small error rate within current write head and island technological parameters.

In a one-pass writing process, neither errors of type A nor type B are minimized. Instead, an effort can only be made to minimize the total error rate which is the sum of errors of type A and type B (A+B). It is useful to have a write process to minimize both type A and type B errors individually, and consequently the resultant total error rate A+B will be much lower.

Described is a writing process which will relax the combined requirement S of switching field distribution and head gradient for high density recording (small L) to achieve an error rate sufficient for industrial production of hard disk drives incorporating bit patterned media. This writing process consists of two passes of writing. The first pass minimizes the error A and disregards the error B. The second pass minimizes the error B without degrading the achieved minimal A. At the end of the two passes of writing, the combined errors of type A and type B will be smaller than the combined errors of type A and type B achieved with only a single pass write.

Figure 3:
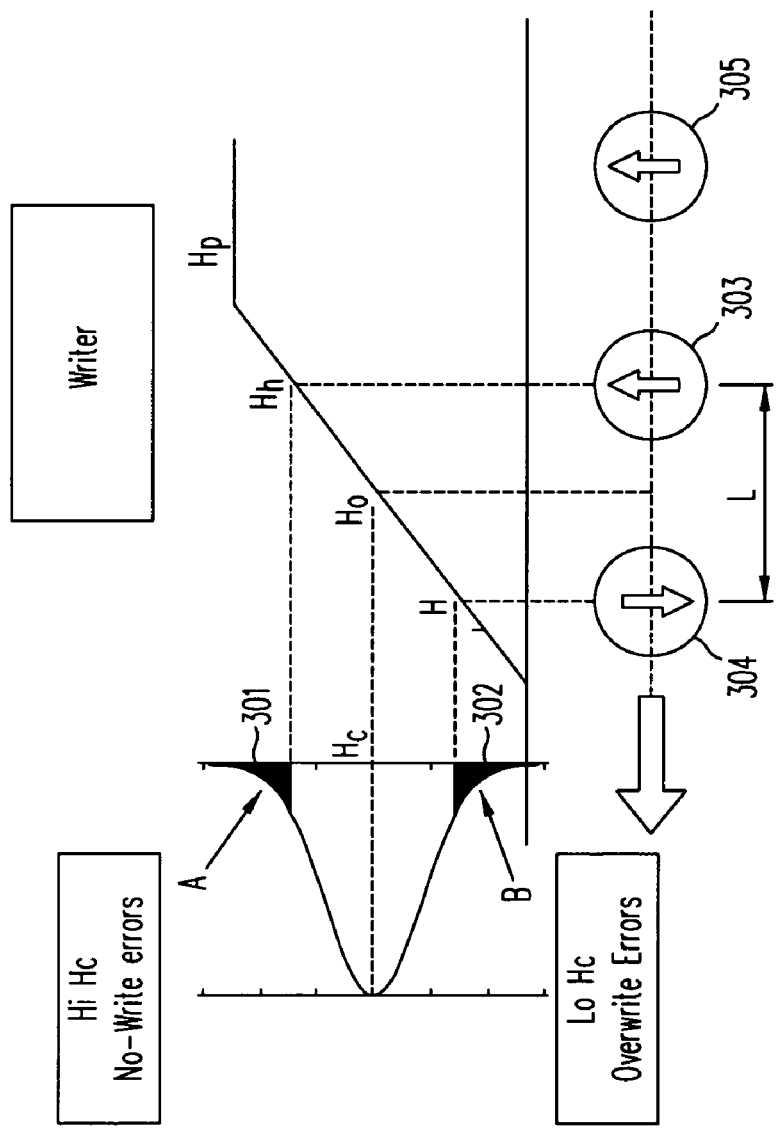
FIG. 3 is graphical representation of writing to bit-patterned media
Figure 4:
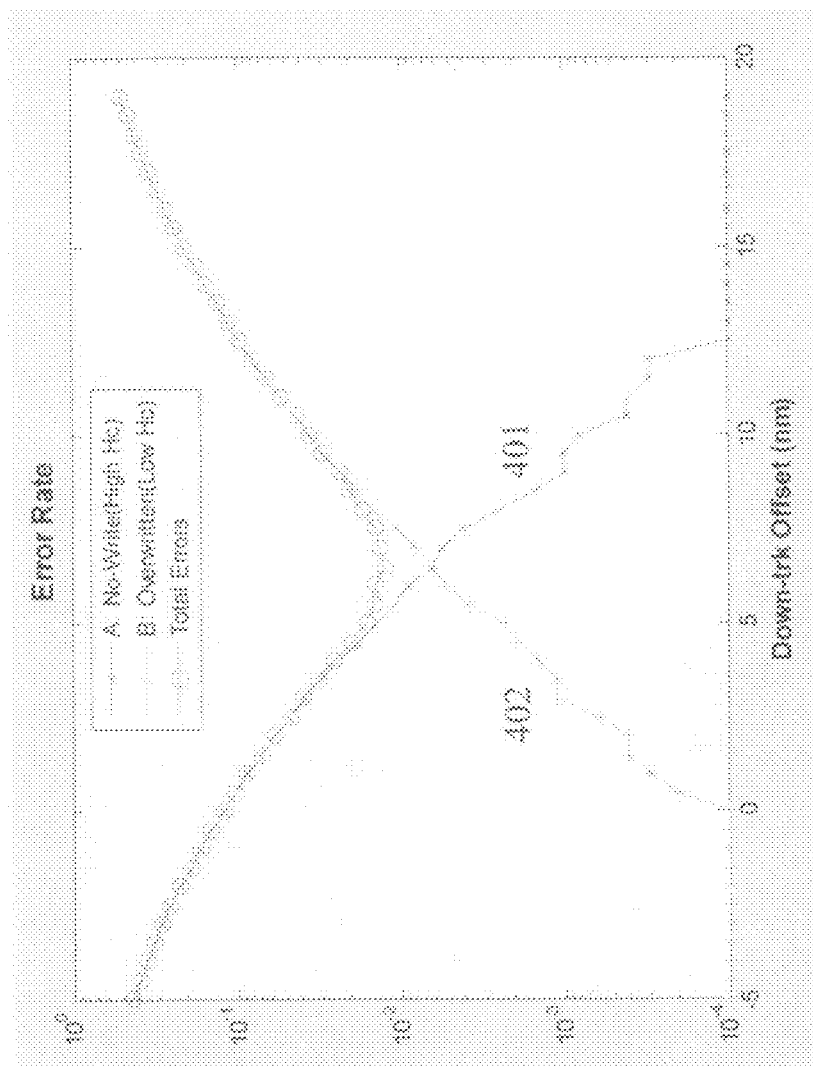
FIG. 4 is a graph of error rate as a function of the down-track offset between the location the write field is switched on to the write polarity and the center of two adjacent islands.

In the writing process as illustrated in FIG. 3, for a given head and head field profile, a stronger field can be utilized to write on the islands by shifting the islands to a stronger field region. FIG. 4 is a graph of error rate as a function of the down-track offset between the head beginning to write and the island to be written in such a write process. The graph was made by computer simulation with the following parameters: a head peak field Hp of 12 KOe, a field gradient of 300 Oe/nm, and a magnetic island mean switching field of 6 KOe. Further, the sigma of the switching field distribution is 1.5 KOe and the island spacing L is 25 nm.

In the stronger field region (larger down-track offset 401), the errors due to a no-write (A) is minimized (<1 $E^{-4}$). But in the same region, islands which have already been written have a higher probability of being overwritten to the wrong polarity (B), and this increases significantly in the positive offset region 402. Consequently the total error rate increases. If the offset is controlled to be in the small or negative side to utilize the weak field for writing, B is minimized (<1 $E^{-4}$), but A is increased significantly. As a result, the total error rate, A+B, in a one pass write scheme is minimized in the middle region to be around 1 $E^{-2}$. This error rate is far worse than the individual minimal values of combined errors A and B (1 $E^{-4}$). A two step writing process overcomes this high error rate.

The first writing step minimizes the errors in the high $H_c$ tail of the distribution, the type A errors 501. This can be achieved by using a stronger writing field (with higher write current), or by shifting the transition location closer to the higher field of the write head (as shown in FIG. 5a), or other means. The method of shifting the transition location is a useful method because, although the islands were written with a stronger field, the field profile and the peak field of the write head are the same. Consequently the neighboring tracks still experience the same fringe write field as before the shift, therefore there is no-degradation in adjacent-track-erasure errors.

In FIG. 5a, the peak write field $H_p$, or a field higher than the write field typically implemented, is used to write the bit. Typically, $H_p$ will be close to $H_h$. Further, $H_0$ will be greater than $H_c$. In minimizing A 501, the first write step disregards the errors of the lower $H_c$ tail of the distributions (type B errors), which are overwritten when writing the next transitions in the second write step. After the first writing step, there are a large number of type B errors, noted in FIG. 5a as $B_1$ 502.

The second write step uses a weaker field to do the second pass of writing as shown in FIG. 5b. During the second pass, islands with a higher switching field than the peak field will not be affected. Therefore, the achieved minimal error A 501 will not be degraded during the second write pass since the islands with higher switch fields are already correctly written. The write field of the head during the second pass is set to be enough to correct the overwrite (type B) errors generated during first pass. Since a weaker field is used, the overwritten error generated by the second pass will be very small, resulting in a very small final B, noted in FIG. 5b as $B_2$ 503. A typical setting for the low peak field is to set the write field just barely above $H_l$.

For example, for the median value of the switching field of an island may be 7-8 KOe, and the peak write field of a head may be 18 KOe. The first pass writing can use the whole peak field to write, i.e. 18 KOe. The second pass of writing can use significantly lower field to write, such as 6 KOe.

In general, on the first pass of the write process, the peak write field of the head may be $1\sigma_H$ to $6\sigma_H$ above the mean switch field of islands on a patterned media, and more preferably, the peak write field of the head may be $5\sigma_H$ to $6\sigma_H$ above the mean switch field of islands in order to minimize the no write errors. On the second pass of the write process, the write field of the head may be $0\sigma_H$ to $3\sigma_H$ lower than the mean switch field of islands on a patterned media, and more preferably, the write field of the head may be $1\sigma_H$ to $3\sigma_H$ lower than the mean switch field of islands. Of course, the goal of setting the field strengths, are to minimize the errors of type A and B and their sum with a given write head strength and SF distribution.

FIG. 6 shows the total error rate using a one write pass process and a two write pass process, respectively, as a function of the down-track offset between the head beginning to write and the island to be written in such a write process (for the two write process, the shift is of the second write pass). As shown clearly, the one pass writing process 601 can only achieved a low error rate of 1 $E^{-2}$. With two write passes, the error rate 602 that can be achieved is better than 1 $E^{-4}$. The parameters used for the results of FIG. 6 are the same as those used for the graph of FIG. 4.

Different types of heads can be used to implement the two pass writing process. The process may be achieved by using a single head that writes with two different head fields in two separate revolutions, or a single head that writes with different points of the field profile. Alternatively, two different write heads built into a single slider can be used to implement the process. Additionally, two different write heads on two different sliders suspended on two head-gimble-assemblies can be used to implement the two step write process. The advantage of a single head options is that it is the simplest and uses neither any additional components nor configuration changes. The advantage of some of the two heads options is that the two pass writing process is completed within one disk revolution.

Although this disclosure illustrates the detail of the two pass writing process, the same idea can be expanded to multiple pass writings. Multiple pass writing may increase the benefit of the two pass writing, at the expense of additional process steps and performance cost. For example, in the two pass process, if the head field of the second pass is too weak, there will exist some islands which are weak enough to have overwritten errors during the first pass, but yet too strong to be corrected by the second pass. If the head field of the second pass is too strong, it will generate overwritten errors of its own. In this case a multiple pass writing process can utilize progressively weaker fields to correct the overwritten errors caused by a previous pass. The final writing field will be so small that it will generate very small overwritten errors.

Writing on bit-patterned media, regardless of implementing a one or two pass writing process, uses synchronized writing, i.e. the writing is controlled to occur at precisely predetermined locations relative to the island positions, to the accuracy of small fraction of the island spacing L.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A hard disk drive including:
   a write head;
   a control unit operably connected to the write head; and
   a single level bit-patterned disk including magnetic islands that each hold a bit of data,
   wherein the control unit executes an operation to write at least one bit of the bit-patterned disk by executing at least a first and a second write operation, the first write operation having the write head utilize a higher write field than a write field used in the second write operation.

2. The hard disk drive of claim 1, wherein the single level bit-patterned disk includes magnetic islands with a mean switch field, wherein the write field utilized by the write head in the first write operation executed by the control unit is higher than the mean switch field and the write field utilized for the second write operation executed by the control unit is smaller than the mean switch field.

3. The hard disk drive of claim 1, wherein the operation to write at least one bit executed by the control unit is synchronized to the position of an island including a bit.

4. The hard disk drive of claim 1, wherein the write head uses a write field of $0\sigma_H$ to $3\sigma_H$ lower than a mean switch field of the magnetic islands of the single level bit-patterned disk during the second write operation executed by the control unit.

5. The hard disk drive of claim 1, wherein the write head uses a write field of $0\sigma_H$ to $1\sigma_H$ lower than a mean switch field of the magnetic islands of the single level bit-patterned disk during the second write operation executed by the control unit.

6. The hard disk drive of claim 1, wherein the write head uses a write field of $1\sigma_H$ to $6\sigma_H$ higher than a mean switch field of the magnetic islands of the single level bit-patterned disk during the first write operation executed by the control unit.

7. The hard disk drive of claim 1, wherein the write head uses a write field of $5\sigma_H$ to $6\sigma_H$ higher than a mean switch field of the magnetic islands of the single level bit-patterned disk during the first write operation executed by the control unit.

8. The hard disk drive of claim 1, wherein the operation to write at least one bit of the single level bit-patterned disk includes at least a third write operation executed by the control unit, the third write operation executed by the control unit having the write head utilize a smaller write field than a write field used in the second write operation executed by the control unit.

9. A method for writing to a hard disk drive including the steps of:
   a first step of writing at least one bit of a single level bit-patterned disk by a write head with a first write field,
   a second step of writing the at least one bit of a single level bit-patterned disk by a write head with a second write field, wherein the first write field is higher than the second write field.

10. The method for writing to hard disk drive of claim 9, wherein the write head that performs the first step of writing the at least one bit is a first write head and the write head that performs the second step of writing the at least one bit is a second write head.

11. The method for writing to a hard disk drive of claim 10, wherein the first write head and the second write head are both on a single slider.

12. The method for writing to a hard disk drive of claim 10, wherein the first write head is located on a first slider and the second write head is located on a second slider.

13. The method for writing to a hard disk drive of claim 9, wherein the first write field is higher than a mean switch field of the bits of the single level bit-patterned disk and the second write field is lower than the mean switch field of the bits of the single level bit-patterned disk.

14. The method for writing to a hard disk drive of claim 9, the first step and second step of writing the at least one bit are synchronized to the position of an island including the bit.

15. The method for writing to a hard disk drive of claim 9, wherein the write head uses a write field of $0\sigma_H$ to $3\sigma^H$ lower than a mean switch field of the magnetic islands of the single level bit-patterned disk during the second write operation.

16. The method for writing to a hard disk drive of claim 9, wherein the write head uses a write field of $0\sigma_H$ to $1\sigma_H$ lower than a mean switch field of the bits of the single level bit-patterned disk during the second step of writing the at least one bit.

17. The method for writing to a hard disk drive of claim 9, wherein the write head uses a write field of $1\sigma_H$ to $6\sigma_H$ higher than a mean switch field of the bits of the single level bit-patterned disk during the first step of writing the at least one bit.

18. The method for writing to a hard disk drive of claim 9, wherein the write head uses a write field of $5\sigma_H$ to $6\sigma_H$ higher than a mean switch field of the bits of the single level bit-patterned disk during the first step of writing the at least one bit.

19. The method for writing to a hard disk drive of claim 9, further including a third step of writing the at least one bit of a single level bit-patterned disk by a write head with a third write field, wherein the second write field is higher than the third write field.

20. A hard disk drive including:
   a write head;
   a control unit operably connected to the first write head; and
   a single level bit-patterned disk including magnetic islands with a mean switch field that each hold a bit of data,
   wherein an operation to write at least one bit of the single level bit-patterned disk includes at least a first and a second write operation executed by the control unit,
   the first write operation executed by the control unit having the write head utilize a write field between $1\sigma_H$ to $6\sigma_H$ higher than the mean switch field and the second operation executed by the control unit having the write head utilize a write field between $0\sigma_H$ to $3\sigma_H$ lower than the mean switch field.

* * * * *